United States Patent [19]

Abell

[11] 4,274,234
[45] Jun. 23, 1981

[54] DOUBLE-WALL GREENHOUSE WITH FLEXIBLE FILM WALLS

[75] Inventor: Irwin R. Abell, Portland, Oreg.

[73] Assignee: Hartwig-Hartoglass, Inc., Woodstock, Ill.

[21] Appl. No.: 14,169

[22] Filed: Feb. 22, 1979

[51] Int. Cl.$^3$ .............................................. E04B 1/12
[52] U.S. Cl. ........................................ 52/63; 52/93; 52/222; 52/273
[58] Field of Search ...................... 52/63, 222, 273, 86, 52/586, 93; 47/17; 160/392, 395, 394, 391, 397

[56] References Cited

U.S. PATENT DOCUMENTS

| | | | |
|---|---|---|---|
| 2,827,138 | 3/1954 | Ray, Jr. .............................. | 47/17 X |
| 2,986,150 | 5/1961 | Torian ................................ | 47/17 X |
| 3,165,110 | 1/1965 | Brooks ............................... | 52/222 |
| 3,811,454 | 5/1974 | Huddle .............................. | 160/395 X |
| 3,830,033 | 8/1974 | Gahler .............................. | 160/391 X |
| 3,950,915 | 4/1976 | Cole .................................. | 52/586 |
| 4,057,941 | 11/1977 | Schwartz .......................... | 52/63 |
| 4,164,105 | 8/1979 | Herbst et al. ..................... | 160/397 X |

FOREIGN PATENT DOCUMENTS 639500  4/1962  Canada ..................................... 52/222

*Primary Examiner*—Carl D. Friedman
*Attorney, Agent, or Firm*—Klarquist, Sparkman, Campbell, Leigh, Whinston & Dellett

[57] ABSTRACT

A double-wall greenhouse with flexible plastic walls is disclosed. The side walls and roof of the greenhouse form an integral tunnel-like shell about an unobstructed internal space. Opposite ends of the shell are closed by end panels. The inner and outer surfaces of the shell are formed by parallel inner and outer flexible plastic glazings which enclose the supporting framework of the shell. Similarly, each end panel has inner and outer flexible plastic glazings enclosing its supporting framework.

The greenhouse can be built in any desired length simply by increasing the number of segments forming the shell. One segment includes two spaced-apart, parallel, upright archlike structural members whose lower ends are secured to opposite parallel sills. A sheet of plastic glazing extends along uninterrupted inner surfaces of the structural members from one sill member to the other. It is secured to the outer surfaces along its edges and ends and uniformly stretched between the members. The inner glazing is attached in similar fashion to the inner surfaces of the arch members and sill members. The edges of the glazings are secured by continuous glazing strips which are inserted, together with a margin of the glazings, into continuous channels extending along the inner and outer surfaces of the structural members and the sill members. Each has two parallel channels on its inner and outer surfaces for securing glazing sheets of adjacent modules.

12 Claims, 5 Drawing Figures

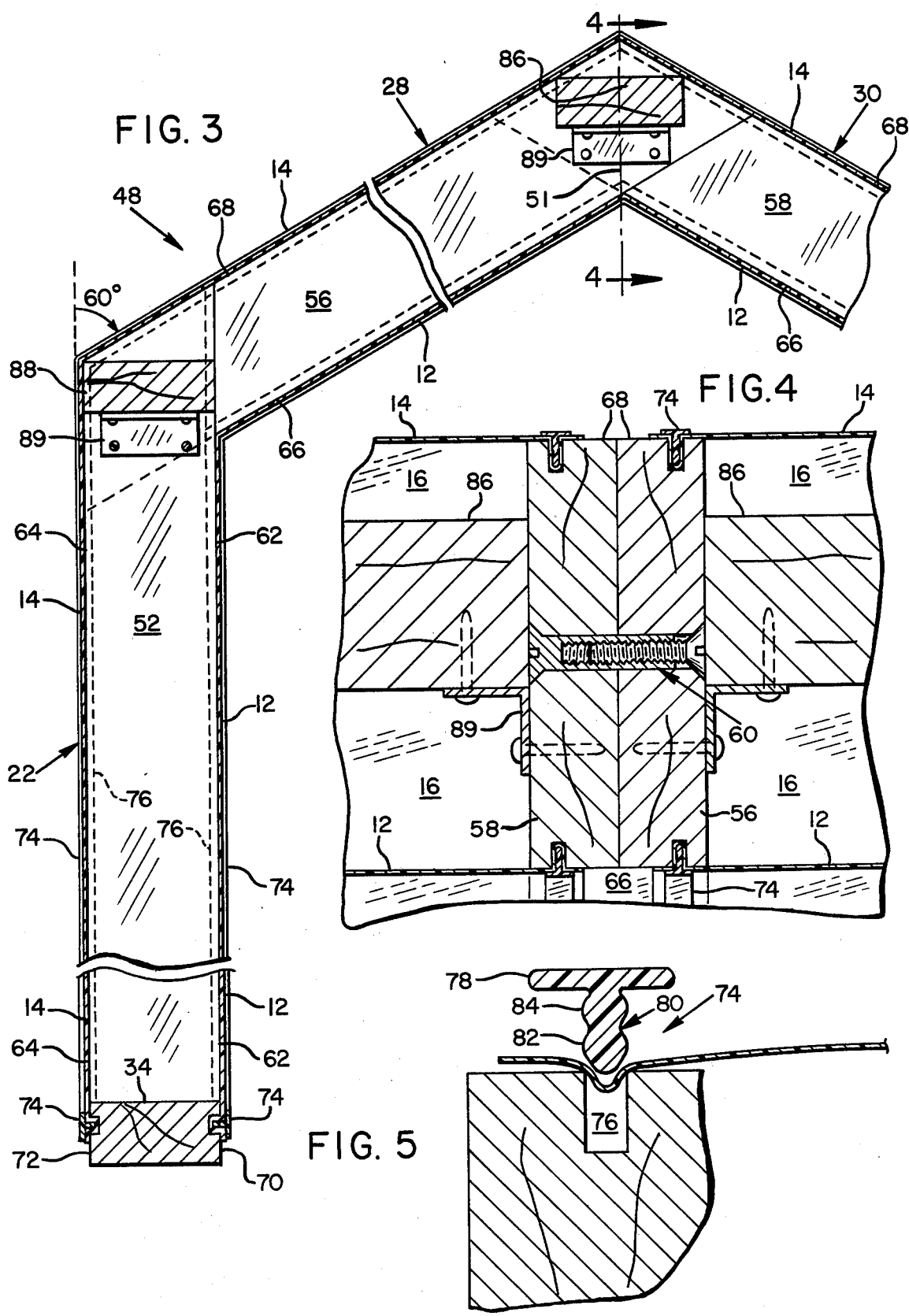

DOUBLE-WALL GREENHOUSE WITH FLEXIBLE FILM WALLS

CROSS REFERENCE TO RELATED APPLICATIONS

Reference is made to my copending patent application, Ser. No. 014,149, filed concurrently herewith, for a Glazing Fastener for Mounting Either Rigid or Flexible Storm Windows.

BACKGROUND OF THE INVENTION

1. Field of the Invention

The invention relates generally to greenhouse construction, and more particularly to double-wall greenhouses having flexible plastic walls.

2. Description of the Prior Art

In the past greenhouses have used glass panes mounted in a metal framework. However, they are very expensive to build and operate and, thus, are only within the financial reach of commercial growers. Such greenhouses are also vulnerable to breakage and to formation of water condensation on the glass panes. Such condensation blocks the sunlight and drips from the window frames, causing damage to the plants. To reduce condensation and cut heating costs, greenhouses have been double glazed, but only at further increase in construction costs.

Such greenhouses are, therefore, very expensive for commercial growers, and far too expensive for the home greenhouse market. It would be preferable to have a greenhouse which is compact, constructed of inexpensive materials, easily assembled, and inexpensive to operate. More specifically, a greenhouse should have a low roofline yet provide adequate standing head room. It should be constructed of inexpensive insulative materials, and include a double glazing. Such glazing should be relatively invulnerable to breakage, should be inexpensive, and should be easily installed.

Several attempts have been made at improving greenhouses and bringing down their costs. One design uses a wooden, rather than metal frame, and substitutes transparent plastic panes for conventional glass. However, such a greenhouse is still expensive to construct. Plastic panes cost nearly as much as glass, and substantial labor and materals is required to assemble the frame and mount the individual panes.

In another variation, sheets of corrugated fiberglass are applied to the roof and walls of the wooden frame. This creates several other problems. The corrugated material is hard to seal along its edges and is difficult to fit around the internal joists and corners of the frame to obtain adequate double-wall construction. In addition, fiberglass material lacks adequate transparency for many greenhouse applications.

In a further variation, sheets of flexible plastic film are attached to the frame by lathe strips nailed to the frame members. However, the plastic film is easily torn by the nails and by corners at the joints in the frame. It is difficult to seal the plastic sheets adequately against the wooden frame. Internal bracing, such as roof joists and corners make it very difficult to double glaze such greenhouses. Finally, such internal bracing necessitates a high roofline on the greenhouse in order to obtain sufficient standing head room. It also interferes with sunlight reaching the plants within the greenhouse.

It has also proven difficult to stretch the plastic film sufficiently to obtain a wrinkle free fit. Various types of framing strips and bead strips have been suggested for securing the edges of film along opposite sides of a window opening. Framing strips commonly have a groove or channel for receiving a complementary glazing or bead strip to secure a margin of the flexible film within the channel. Such an arrangement is shown in my own prior patent, U.S. Pat. No. 3,991,806 and patents cited therein. However, such fasteners either fail to stretch the fabric sufficiently to remove the wrinkles when assembled, or are unable to hold the film under sufficient tension without the bead strips pulling from their grooves.

A second greenhouse design uses an inflated structure of transparent plastic film. Such a greenhouse has no frame and therefore avoids the head room and shade problems, but it cannot be double glazed. Furthermore, such a greenhouse is expensive to keep inflated and vulnerable to damage.

A third design employs bowed aluminum arches over which plastic film is stretched. In this design it has been very difficult to obtain an adequate air seal at the bottom where the plastic meets the ground and around the ends. More importantly, such a design cannot be double glazed since there was no way of attaching a second wall to the inside of the aluminum bows.

SUMMARY OF THE INVENTION

From the foregoing, there remains a need for a greenhouse which is inexpensive to build and to operate, is compact yet provides sufficient standing head room, is not overly vulnerable to damage, avoids problems of moisture condensation and dripping, and does not unduly shade plants inside the structure. Such a greenhouse should be constructed of a small number of parts to reduce costs of materials and labor for assembly. The design of such a greenhouse should also be readily expandable to a variety of sizes using the same kinds of parts used in the basic design. These are, therefore, the principal objects of the invention.

The greenhouse of the invention employs a thermally insulative frame that is especially adapted for attaching continuous sheets of flexible glazing material along inner and outer surfaces of the frame to form double walls.

The frame features multiple parallel, upright structural members spaced apart along two preferably parallel sill members. The inner and outer surfaces of each structural member parallel those of the other members and are contiguous with the inner and outer surfaces, respectively, of the sill members. The inner and outer surfaces of such members are unobstructed by braces or joists so that a rectangular sheet of flexible plastic film can extend along such surfaces without interference.

One side margin of a first sheet of flexible film extends lengthwise along the inner surface of a first structural member and the opposite side margin extends along the inner surface of a second structural member. The end margins extend along the inner surfaces of the sill members between the first and second structural members. Similarly, the margins of a second sheet extend along the outer surfaces of the two structural members and the portions of the sill members between them.

Thus, the inner and outer walls enclose an insulative airspace whose thickness corresponds to the spacing between the inner and outer surfaces. Such walls are preferably parallel and spaced between two inches and four inches apart.

The margins of the sheets forming the walls are attached continuously along the inner and outer surfaces by glazing fastener means. Glazing fastener means includes a channel means defining a channel along such surfaces and a glazing strip means having a portion adapted for insertion into the channel together with the margin of a glazing sheet.

Each structural member features two spaced apart upright portions for supporting the building's side walls and a connecting portion extending between the upright portions for supporting its roof. The member is preferably symmetrical about a centerline between the upright portions and can be separable into at least two submembers. Such submembers can be substantially identical halves of the structural member, or individual rafters and stud members.

In another aspect of the invention the inner and outer surfaces of the structural member define, in cross-section, opposite sides of a rectangle. The width of the inner and outer surfaces is preferably narrower than the distance between them.

The channels can be formed directly in the parallel inner and outer surfaces thus defined. The glazing strip means can be a strip having a T-shaped cross-section and including an insert flange adapted for fitting snugly within the channel. The channel is preferably at least twice as deep as its width, the insert flange extending nearly to the bottom of the channel.

The insert flange can include two parallel ribs extending lengthwise along each side, the ribs being preferably positioned symmetrically about a centerline between opposite sides of the flange. This arrangement permits the flexible plastic to be stretched in two stages as the glazing strip is inserted all around to the depth of the first rib, and then pushed in to the depth of the second rib.

The end walls or panels, at least one having a door opening therethrough, have a peripheral structural member whose general shape is the same as that of the afore-mentioned structural members which form the side walls and roof of the building. However, it is slightly smaller so that it can be positioned in close parallel abutting relationship against an end one of the first-mentioned structural members to obtain a tight airseal at the corner of the building and yet have an unobstructed inner face for attaching a margin of the inner wall at the corner.

A third end wall, preferably with a door opening therethrough, can be placed across the middle of the building with one of the first-mentioned structural members abutting it on each side. Thus the building is easily divided into compartments which are thermally insulated from one another.

The frame can also have bracing extending between the structural members. Such bracing, which is contained entirely within the airspace between the inner and outer walls, cooperates with the stretched flexible film to further rigidify the building. Thus, the use of joists or other braces across the internal space of the building can be eliminated.

These and other objects, advantages and features will become more apparent from the following detailed description of a preferred embodiment of the invention which proceed with reference to the drawings.

BRIEF DESCRIPTION OF THE DRAWINGS

FIG. 3 is a fragmentary vertical sectional view taken long line 3—3 in FIG. 1 with the plastic walls in place.

FIG. 4 is a cross-sectional view taken along line 4—4 in FIG. 3.

FIG. 5 is an enlarged cross-sectional view of a channel and glazing strip of the type employed in the present invention for securing the flexible film walls to the frame.

DETAILED DESCRIPTION OF THE INVENTION

Figure 1:
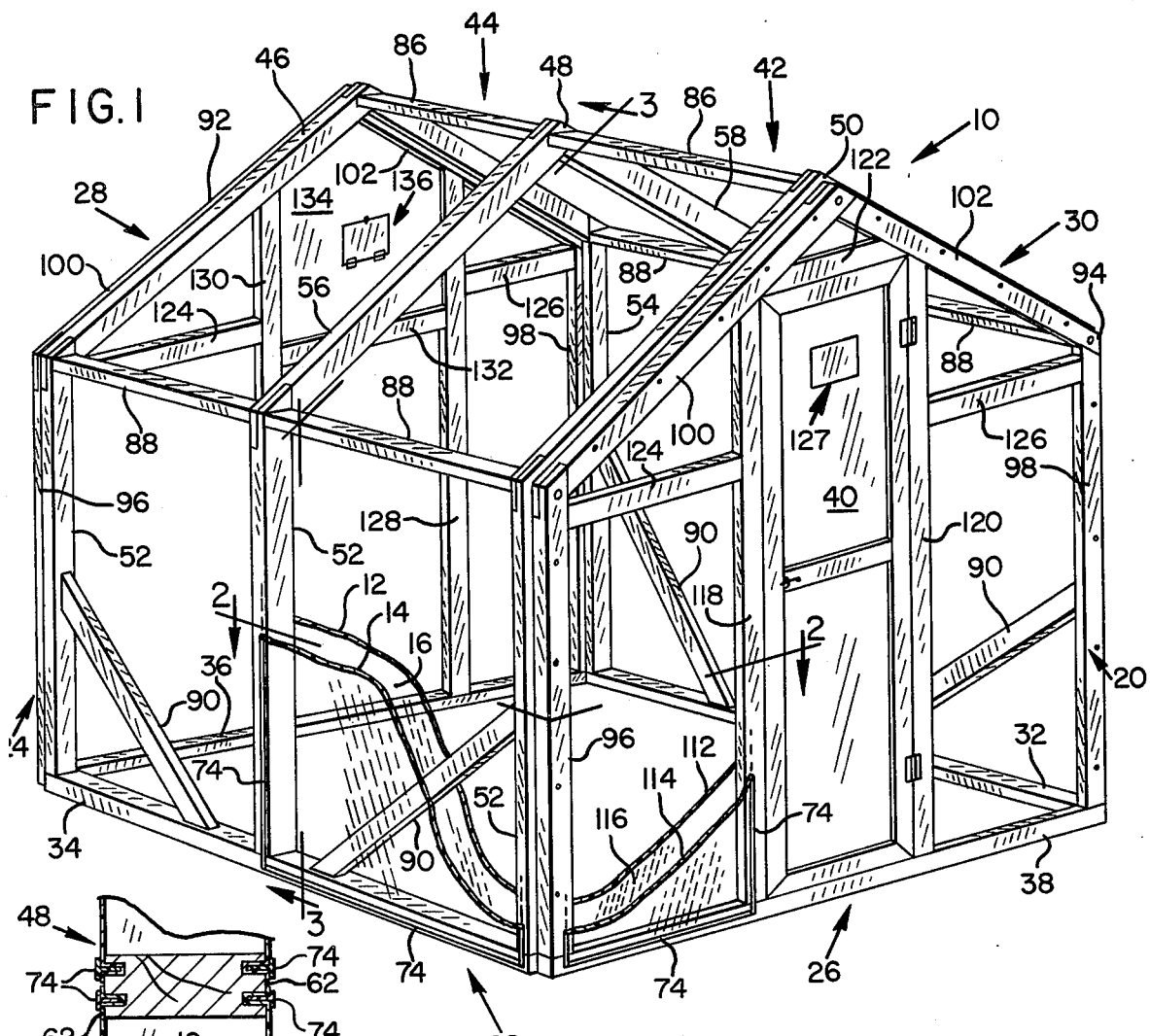
FIG. 1 is a perspective view of the frame of a greenhouse according to the present invention, with fragmentary portions of the plastic walls in position on the shell and with the channels for the margins of the remaining portions of the plastic walls omitted for clarity.

In FIG. 1 a double wall building structure with flexible film walls, such as a greenhouse, has a frame 10 supporting inner and outer flexible walls 12, 14. The walls enclose the frame and an insulative layer of air 16. The frame is preferably made of redwood 2"×4" lumber, although other insulative materials, such as molded low density plastic will suffice. The walls are preferably made of vinyl plastic or mylar film.

In general, the structure is rectangular with a pitched roof. It has two opposed rectangular side wall panels 20, 22 and two opposed pentagonal end wall panels 24, 26. The pitched roof is defined by two rectangular roof panels 28, 30. The lower edges of the side panels 20, 22 are defined by two parallel opposed sill members 32, 34, respectively. Similarly, the lower edges of the end panels 26, 28 are defined by parallel sill members 36, 38, respectively.

Figure 2:
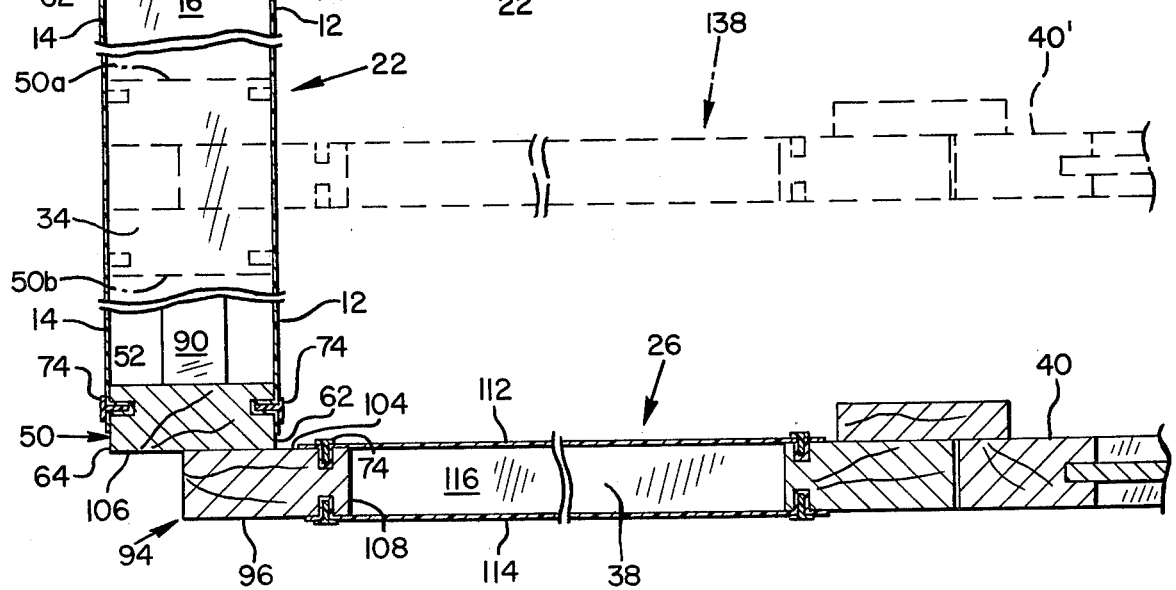
FIG. 2 is a fragmentary horizontal sectional view taken along line 2—2 in FIG. 1.

The side wall panels and roof panels form an integral tunnel-like shell, opposite ends of which are closed by the end panels. The internal space thus defined is unobstructed by joists or other bracing structure. Referring to FIG. 3, the inner surface of the shell is defined by the flexible inner wall 12. Similarly, the outer surface of the shell is defined by the outer flexible wall 14. In the same way the inner and outer surfaces of the end panels 24, 26 are defined by inner and outer walls 112, 114. However, end panel 26 also has a centrally positioned door opening therethrough and a door 40 within the opening (FIGS. 1 and 2).

The greenhouse of FIG. 1 includes two segments, indicated generally by reference numerals 42 and 44. Segment 44 extends from structural member 46 adjacent to end panel 24, to structural member 48, which is positioned equidistant between the end panels. Similarly, segment 42 extends from structural member 48 to structural member 50, which is adjacent to end panel 26. Structural members 46, 48 and 50 are identical and symmetrical about a centerline 51 (FIG. 3) between the wall panels 20 and 22.

Each structural member has two upright portions consisting of studs 52, 54, and a roof portion, consisting of rafters 56, 58, extending between the upright portions. Referring to FIG. 3, the lower end of vertical stud 52 is connected to horizontal sill member 34. Rafter 56 is connected to the upper end of stud 52 and extends at an angle, for example, approximately 60°, from the vertical in the direction of stud member 54 (not shown). Rafter 56 meets rafter 58 at the centerline of the structure.

Studs 52 and 54 are identical. Similarly, rafters 56 and 58 are identical. Stud 54 has its lower end cut off square and its upper end cut at an angle from the vertical, for example, about 60°. Opposite ends of rafter 56 are cut at the same angle so that a side view of rafter 56 defines a trapezoid. Refering to FIG. 4, the upper ends of the studs and the ends of the rafters are connected at lap joints held together by a male-female double headed screw 60, and further reinforced by the use of wood glue.

In forming the preferred type of lap joint, the upper end of each stud is sawn in a plane normal to the wall panel and intermediate the sides of the stud to a depth corresponding to the width of the rafter which is to be connected to the stud. A second cut is then made normal to the first cut and at an angle, for example, a 60° angle, from the vertical, to remove a parallelogram-shaped piece of wood from the end of the stud. A similar operation is performed on each end of rafters 56, 58 and on stud 54.

Referring to FIG. 3, it can be seen that the studs have an inner surface 62 and an outer surface 64. At the lower end of the stud where it meets the sill member, its inner surface 62 is coplanar with the inner surface 70 of the sill member. Similarly, the outer surface 64 of the stud is coplanar with the outer surface 72 of the sill member. At the upper end of the stud inner surface 62 intersects the inner surface 66 of the rafter at an angle, for example, 60°. Similarly, outer surface 64 intersects outer surface 68 at the same angle. Surface 68 includes the upper face of rafter 56 and the end of stud 52.

Thus, the inner surface of the structural member extends continuously from an inner surface of the sill member along the inner surface of the upright portion, along the lower surface of the roof portion, continuing down along the inner surface of the other upright portion and ending at the inner surface of the opposite sill member. Similarly, the outer surface of the structural member extends continuously from the outer surface of the sill member, upwardly along the outer surface of the upright portion, along the upper sides of the roof portion and downwardly along the outer surface of the opposite upright portion to meet the outer surface of the opposite sill member. The sill member's inner surface 70 extends laterally along each sill member, such surfaces intersecting at the building's corners. The outer surfaces 72 also extend along each sill member, but need not meet at the corners.

Referring to FIG. 5, a flexible glazing fastener means 74 includes a channel 76 and a glazing strip 78. Such glazing fastener means are described in detail in my above referenced copending application for patent, which is incorporated by reference herein. In general, the glazing strip includes an insert flange 80 having two pairs of ribs 82, 84 along each side.

The insert flange is designed to stretch the flexible glazing film as the flange is pushed into the channel. One purpose of the ribs on each side of the flange is to emable the film to be progressively stretched in a two stage operation. Thus, the flange is inserted into the channel together with the film in the first stage and pressed in to the extent of the first pair of ribs 82 where it remains while the rest of the film is being secured around its other margins. Once the first stage has been completed around all of the margins of the film, the glazing strip is pressed in the rest of the way, thereby further stretching the film. The film is compressed tightly between the channel walls and the ribs on each side of the insert flange, and is thereby securely held in place.

Referring to FIGS. 2 and 4, channels of the type shown in FIG. 5 are provided on the inner and outer surfaces of the structural members. In member 48 there are two parallel channels extending along the inner surfaces and two more parallel channels extending along the outer surfaces. A channel also extends laterally along each of the inner and outer surfaces of the sill members and intersects the channels extending downward from the structural members.

In FIG. 2, member 50 has a single channel extending along its inner and outer surfaces. In practice, two such channels are likely to be provided as in member 48, even though one channel in each surface would be unused, so that a single configuration of structural member can be used throughout the greenhouse.

Two continuous rectangular sheets of flexible glazing material form the inner and outer walls 12, 14 of each segment 42, 44. Referring to FIG. 3, the end margins of each sheet are attached to inner and outer surfaces 70, 72 of the sill members by glazing fasteners 74. The sheet forming inner wall 12 in segment 42 is stretched between structural members 48 and 50 and is continuously secured along its side margins to the inner surfaces 62, 64 of each member 48, 52 by fasteners 74. Similarly, the sheet forming outer wall 14 is stretched between members 48 and 50 secured to the outer surfaces 64, 68 of each member 48, 58. Segment 44 is likewise provided with inner and outer walls.

Referring to FIG. 1, ridge poles 86 extend horizontally between the peaks of the structural members. Plate members 88 extend horizontally between the structural members at the joints formed between the studs and the raftes. The plate members and the ridge poles are all of the same length, which length is equal to the spacing between the structural members. Thus, poles 86 and plate members 88 maintain the parallel relationship between the structural members 46, 48, 50 and support portions of the outer wall 14 along their corners.

Diagonal braces 90 extend at 45° angles from the sill members 32, 34, within the airspace 16, to the sides of structural members 46 and 50. Such braces maintain the perpendicular relationship of the structural members to the sill members.

The poles and plate members are attached to the structural members by angle plates 89, nailed to the members on one side of plate 89 and to the poles and plate members on the other side.

The pentagonal end wall panels 24 and 26 include structural members 92 and 94, respectively, closely abutting members 46 and 50. members 92 and 94 are similar in their overall construction to members 46, 48 and 50 but are slightly smaller.

More specifically, structural members 92 and 94 have vertical studs 96, 98 which are shorter than studs 52, 54, and rafters 100, 102 which are slightly shorter than rafters 56, 58. Referring to FIG. 2, stud 96 has an inner side face 104 abutting and partially overlapping side face 106 of structural member 50. Face 108 of stud 96 is spaced inwardly of the inner surface 62. This spatial relationship is maintained uniformly along members 50, 94 and also exemplifies the relationship of members 46, 96 at the opposite end of the building, as can be seen by reference to FIG. 1.

Such relationship increases the stability of the structure and provides attachment surfaces for the flexible walls 112 and 114 about airspace 116 in the end panels. By bolting members 92, 94 to members 46, 50 and glueing their overlapping faces 104 and 106 together, a tight seal is obtained along the corners of the structure.

In end panel 26 two spaced-apart vertical studs 118, 120 extending from sill member 38 to rafters 100, 102 and a horizontal head member 122 extending between rafters 100 and 102 to frame door 40. Horizontal braces 124, 126 extend from the door frame to studs 96, 98, to further reinforce the end panel. The door also has a vent 127.

End wall panel 24 has two spaced-apart vertical studs 128, 130 extending from sill member 36 to rafters 100, 102 and a horizontal brace 132 extends between them to support a solid panel 134, which also has a vent 136. Vents 127, 136 each include a small hinged door.

It is sometimes desirable to divide a greenhouse into multiple compartments which can be kept at different temperatures. Referring to FIG. 2, an additional end panel 138 (shown in phantom lines) is inserted into the greenhouse between members 48 and 50, increasing its length to three segments and dividing the building crosswise into two compartments.

Panel 138 is sandwiched between two structural members 50a and 50b, abutting such members in the manner described above for end panel 26. Panel 138 is substantially identical to panel 26, and members 50a, and 50b are substantially identical to member 50. It is apparent that such a building may contain any desired number of segments with or without additional panels 138.

Numerous variations of structure are possible within the spirit of the invention. For example, arched structural members can be substituted for the angular structural members 50, 94. Such arched members can be molded plastic, fiberglass or laminated wood, and can be made in one piece, or in two identical halves. It is also possible for the combined members 50, 94 to be formed in one piece.

Having illustrated and described a preferred embodiment of the invention, it should be apparent to those skilled in the art that the invention may be modified in arrangement and detail. I claim as my invention all such modifications as come within the true spirit and scope of the following claims.

I claim:

1. In a double-wall building structure with flexible walls, a structural member comprising:
   two upright portions having lower ends for positioning along opposite sides of said structure to support sidewalls thereof;
   a connecting portion extending between said upright portions opposite said lower ends to support a roof of said structure;
   the structural member having an uninterrupted inner surface beginning at the lower end of one of said upright portions, extending along the lower side of said connecting portion, and continuing along the other of said upright portions to the lower end thereof;
   the structural member also having an outer surface opposite said inner surface and extending along outer and upper sides of said member; and
   glazing fastener means along said inner and outer surfaces for attaching said flexible walls along an unbroken line to each of the inner and outer surfaces of said member;
   the structural member including at least two separable submembers joined together by lap joints;
   the glazing fastener means including channel means and glazing strip means;
   the channel means defining a pair of parallel channels on each of the inner and outer surfaces of the structural member, one of said channels extending along each side of said lap joint to continue said unbroken line from one submember to another;
   the glazing strip means including an insert flange for insertion into the channel together with a margin of said flexible walls, the insert flange having ribs such that it can be progressively inserted into said channel to stretch said flexible walls in a two-stage operation to impart tension in said inner and outer walls to rigidify said structure.

2. A structural member according to claim 1, in which said structural member is symmetrical about a centerline between said upright portions;
   said structural member being separable into at least two substantially identical submembers.

3. A structural member according to claim 2, in which said structural member includes two submembers separable about said centerline.

4. A structural member according to claim 1, in which each submember has a vertical stud member defining said upright portion and a rafter member defining a portion of said connecting portion, the rafter member being joined to the stud member at an angle of approximately 60° from the vertical plane.

5. A structural member according to claim 1, in which said inner and outer surfaces define, in cross-section, opposite sides of a rectangle, said channels being formed directly in said surfaces, the spacing between said surfaces being greater than their width.

6. In a double-wall building structure with flexible walls, a structural member comprising:
   two upright portions having lower ends for positioning along opposite sides of said structure to support sidewalls thereof;
   a connecting portion extending between said upright portions opposite said lower ends to support a roof of said structure;
   the structural member having an uninterrupted inner surface beginning at the lower end of one of said upright portions, extending along the lower side of said connecting portion, and continuing along the other of said upright portions to the lower end thereof;
   the structural member also having an outer surface opposite said inner surface and extending along outer and upper sides of said member; and
   glazing fastener means along said inner and outer surfaces for attaching said flexible walls along an unbroken line to said member;
   said glazing fastener means including a channel extending lengthwise along said surfaces and glazing strip means for insertion into said channel together with a margin of said walls;
   said channel having two parallel channel walls, the depth of said channel being approximately 2.5 times the distance between said channel walls, and
   said glazing strip including an insert flange and two external flanges positioned to define a generally T-shaped cross-section; the insert flange having two symmetrically-positioned ribs extending lengthwise along each side, the thickness of the insert flange at said ribs being approximately equal to the width of said channel, said insert flange extending nearly to the bottom of said channel.

7. A double-wall building structure with flexible walls, comprising:
    rectangular sill means for supporting said structure, each side of said sill means having parallel inner and outer surfaces;
    at least two upright, parallel structural members defining a roof and walls in said structure, said members being spaced part along said sill means and having their lower ends secured to two opposite sides of said sill means, said structural members having lengthwise parallel inner and outer surfaces contiguous with the inner and outer surfaces, respectively, of said two sides of said sill means;
    a first flexible film wall having margins extending along said outer surfaces and a second flexible film wall having margins extending along said inner surfaces, said walls being stretched from side-to-side between said members and extending end-to-end from one side of said sill means to the opposite side of said sill means to enclose an airspace therebetween; and
    glazing fastener means for attaching said flexible walls along said inner and outer surfaces,
    each of said fastener means including a channel and a glazing strip having an insert portion adapted for insertion into said channel together with a margin of one of said flexible walls, said channel being oriented so that the direction of insertion of said insert portion is approximately normal to said flexible walls,
    said channel and insert portion having lengths in said insertion direction of at least twice their respective widths.

8. A double-wall building structure with flexible walls, comprising:
    rectangular sill means for supporting said structure, each side of said sill means having parallel inner and outer surfaces;
    at least two upright, parallel structural members defining a roof and walls in said structure, said members being spaced apart along said sill means and having their lower ends secured to two opposite sides of said sill means, said structural members having lengthwise parallel inner and outer surfaces contiguous with the inner and outer surfaces, respectively, of said two sides of said sill means;
    a first flexible film wall having margins extending along said outer surfaces and a second flexible film wall having margins extending along said inner surfaces, said walls being stretched from side-to-side between said members and extending end-to-end from one side of said sill means to the opposite side of said sill means to enclose an airspace therebetween; and
    glazing fastener means for attaching said flexible walls along said inner and outer surfaces including channel means and strip means;
    said channel means including a channel extending along each of said inner and outer surfaces, the channels of said structural members extending in an unbroken line along said members from one lower end to the other lower end to meet the channels of said sill means;
    said glazing strip means including an insert portion adapted for insertion into said channel together with a margin of one of said walls;
    the inner and outer surfaces of said structural members defining, in cross-section, opposite sides of a rectangle;
    said channel means including two parallel channels in each of the inner and outer surfaces of said members,
    the channels having a depth which is between two and three times their width; and
    said insert portion being a flange having parallel opposite sides and two parallel, lengthwise-extending ribs on each side, said ribs being spaced apart and positioned symmetrically about a centerline between said sides.

9. A double-wall building comprising:
    structure defining two side walls and a roof integrally connecting said side walls;
    two end walls, at least one of which has a door frame defining a door opening therethrough; and
    sill members supporting said walls, said sill members including parallel inner and outer surfaces;
    said structure including:
        multiple, substantially identical, parallel, upright structural members spaced along two of said sill members and having opposite lower ends connected thereto; each structural member being formed of thermally insulative material and having parallel opposite inner and outer surfaces in said side walls and roof, said surfaces extending uninterrupted between and meeting the inner and outer surfaces, respectively, of said two sill members;
        two continuous sheets of flexible wall material extending from side to side between two of said structural members and from end to end between said two sill members; opposite margins of one sheet extending lengthwise along the inner surfaces of said structural members and opposite margins of the other sheet extending lengthwise along the outer surfaces of said two structural members;
        each of said sheets being continuously attached along its margins to said surfaces and being stretched tightly therebetween;
    said end walls each including:
        a second upright structural member positioned in parallel abutting relationship along a side of an end one of said multiple members;
        said second member and said door frame having inner and outer surfaces in planes normal to the inner and outer surfaces of said multiple members and meeting the inner and outer surfaces, respectively, of one of said sill members;
        said second member being of the same general shape as said multiple members, but being sufficiently smaller that a first portion of its inner surface partially overlaps the side of the end one of said multiple members, and a second portion of its inner surface forms an inner corner with the inner surface of said end one of said multiple members; and
        a continuous sheet of flexible wall material extending along each of the inner and outer surfaces of said end wall, said sheet being continuously attached along its margins to one of said surfaces and being stretched therealong.

10. A building according to claim 9, in which said structure includes bracing members extending between upper portions of two adjacent ones of said multiple structural members, said bracing members being enclosed between said two sheets of flexible wall material.

11. A building according to claim 9, including a third end wall having a frame defining a door opening therethrough; said third end wall being positioned intermediate said two end walls and sandwiched in abutting relationship between two of said multiple structural members, thereby dividing said building into two compartments.

12. In a double-wall building structure with flexible walls, a structural member comprising:

two upright portions having lower ends for positioning along opposite sides of said structure to support sidewalls thereof;

a connecting portion extending between said upright portions opposite said lower ends to support a roof of said structure;

the structural member having an uninterrupted inner surface beginning at the lower end of one of said upright portions, extending along the lower side of said connecting portion, and continuing along the other of said upright portions to the lower end thereof;

the structural member also having an outer surface opposite said inner surface and extending along outer and upper sides of said member; and glazing fastener means along said inner and outer surfaces for attaching said flexible walls along an unbroken line to said member;

the glazing fastener means including a channel and a glazing strip having an insert portion adapted for insertion into said channel together with a margin of one of said flexible walls, said channel being oriented so that the direction of insertion of said insert portion is approximately normal to said flexible walls;

said channel and insert portion having lengths in said insertion direction of at least twice their respective widths;

the insert portion being insertable to at least two different depths in said channel to stretch and hold said walls under an amount of tension which corresponds to the depth of insertion of said portion.

* * * * *